United States Patent
Snapp

(10) Patent No.: US 9,848,310 B1
(45) Date of Patent: *Dec. 19, 2017

(54) PROVIDING TEMPORARY CALLBACK NUMBER FOR EMERGENCY CALLS

(71) Applicant: West Corporation, Omaha, NE (US)

(72) Inventor: John Lawrence Snapp, Westminster, CO (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,271

(22) Filed: Apr. 30, 2014

Related U.S. Application Data

(63) Continuation of application No. 12/049,472, filed on Apr. 4, 2008, now Pat. No. 8,737,948.

(51) Int. Cl.
*H04M 11/04* (2006.01)
*H04W 4/22* (2009.01)
*H04W 76/00* (2009.01)

(52) U.S. Cl.
CPC ............ *H04W 4/22* (2013.01); *H04W 76/007* (2013.01)

(58) Field of Classification Search
CPC ..... H04W 4/22; H04W 76/007; H04W 48/02; H04W 4/02; H04W 48/16; H04W 4/021; H04W 52/0264; H04W 68/00; H04W 88/02; H04W 4/005; H04W 36/24; H04W 36/38; H04W 40/24; H04W 92/10; H04W 60/04; H04W 8/16; H04M 3/5116; H04M 2242/04; H04M 2207/18; H04M 3/42195; H04M 1/72536; H04M 11/04; H04L 5/0098; H04L 12/4633; H04L 45/00; H04L 12/5865; H04L 2012/5607; H04L 61/1588
USPC ................... 455/435.2, 550.1, 414.2; 379/45
See application file for complete search history.

(56) References Cited

U.S. PATENT DOCUMENTS

| | | | |
|---|---|---|---|
| 8,244,204 B1* | 8/2012 | Chen ................. | H04M 3/42195 379/114.28 |
| 8,737,948 B2* | 5/2014 | Snapp ................. | H04M 3/5116 379/45 |
| 2008/0089486 A1* | 4/2008 | Madour ................. | H04L 65/40 379/45 |
| 2008/0214141 A1* | 9/2008 | Burdick ............ | H04M 3/42195 455/404.1 |
| 2010/0173606 A1* | 7/2010 | Mahn ..................... | H04M 3/38 455/410 |

* cited by examiner

*Primary Examiner* — Nimesh Patel
(74) *Attorney, Agent, or Firm* — Raffi Gostanian

(57) ABSTRACT

A system, method, and computer readable medium comprising instructions for providing temporary callback number for emergency calls is disclosed. A determination is made as to whether a restriction is imposed on a mobile user for incoming calls. A temporary callback number for the mobile user is generated if the restriction is imposed. A request for a callback to the mobile user comprising the temporary callback number is detected. The callback is routed to the mobile user using the temporary callback number.

24 Claims, 5 Drawing Sheets

PROVIDING TEMPORARY CALLBACK NUMBER FOR EMERGENCY CALLS

CROSS-REFERENCE TO RELATED APPLICATIONS

This application is a continuation from U.S. patent application Ser. No. 12/049,472, filed Apr. 4, 2008, and entitled "PROVIDING TEMPORARY CALLBACK NUMBER FOR EMERGENCY CALLS", which is incorporated by reference herein in its entirety.

FIELD OF THE INVENTION

The present disclosure is generally related to an emergency service communications network, and more particularly to providing temporary callback numbers for calls to emergency services in an emergency service communications network.

BACKGROUND OF THE INVENTION

In an emergency situation, persons involved or bystanders often contact emergency services by placing a 9-1-1 emergency call from their home or cellular phone. An emergency operator at a public safety answering point (PSAP) who received the call takes the information provided by the caller and may initiate or coordinate the dispatching of the necessary emergency service providers to handle the situation. Common emergency service providers that are dispatched include the police, the fire department, emergency medical services (EMS), and the like.

However, some callers may have call restrictions placed on their phones or their phones have an address or phone number that cannot be dialed over the PSTN or represented as a ten-digit North American numbering plan number. For example, a phone may be restricted as to what numbers it may call and who can call that phone. A child's phone may be setup so that the child can only call 911 or the parents and can only receive calls from the phone numbers associated with the parents. Calls and text messages to and from other phone numbers may be blocked. While these features may be advantageous to some callers, a problem exists when emergency calls are placed and a callback is initiated by emergency service providers. Because the phone number of an emergency service provider is not an "allowed number", an incoming call from the emergency service provider may be blocked. Therefore, what is needed is the ability to provide a method to call back these restricted phones by use of a temporary call back number.

SUMMARY OF THE INVENTION

The present disclosure provides a method, a system, and computer instructions for providing temporary callback number for emergency calls in an emergency service communications network.

The present disclosure describes a method for providing temporary callback numbers for emergency calls. A determination is made as to whether a restriction is imposed on a mobile user for incoming calls or for some other reason the PSAP may have difficulties returning a call to this caller with the native address of the device. A temporary callback number for the caller is allocated if the system determines there may be difficulties in successfully returning the call to the caller. If a callback using the temporary callback number is attempted, the call will be routed to a gateway where it will be relayed to the true address or phone number of the caller. If the caller is restricted from receiving specific calls, the system will allow the call through because of special predetermined identifiers such as a special value for the ANI (Automatic number identification) or the Calling Party Number The present disclosure describes a system for providing temporary callback numbers for emergency calls. The system comprises a mobile unit, a mobile switching center (MSC) communicably coupled to the mobile unit and the emergency call voice network, a gateway mobile location center (GMLC) or Mobile Positioning Center (MPC) for determining the routing of an emergency call. The GMLC or MPC is communicably coupled to the mobile switching center (MSC) and emergency service data network, a temporary callback number gateway which is communicably coupled to the GMLC/MPC and a telephone network, and a public safety answering point for initiating a callback to the mobile unit through the telephone network, the public safety answering point is communicably coupled to the emergency call voice network and the emergency call data network. The system further comprises a database for storing user information of the mobile unit, the database is communicably coupled to the GMLC/MPC.

DETAILED DESCRIPTION OF THE INVENTION

Figure 1:
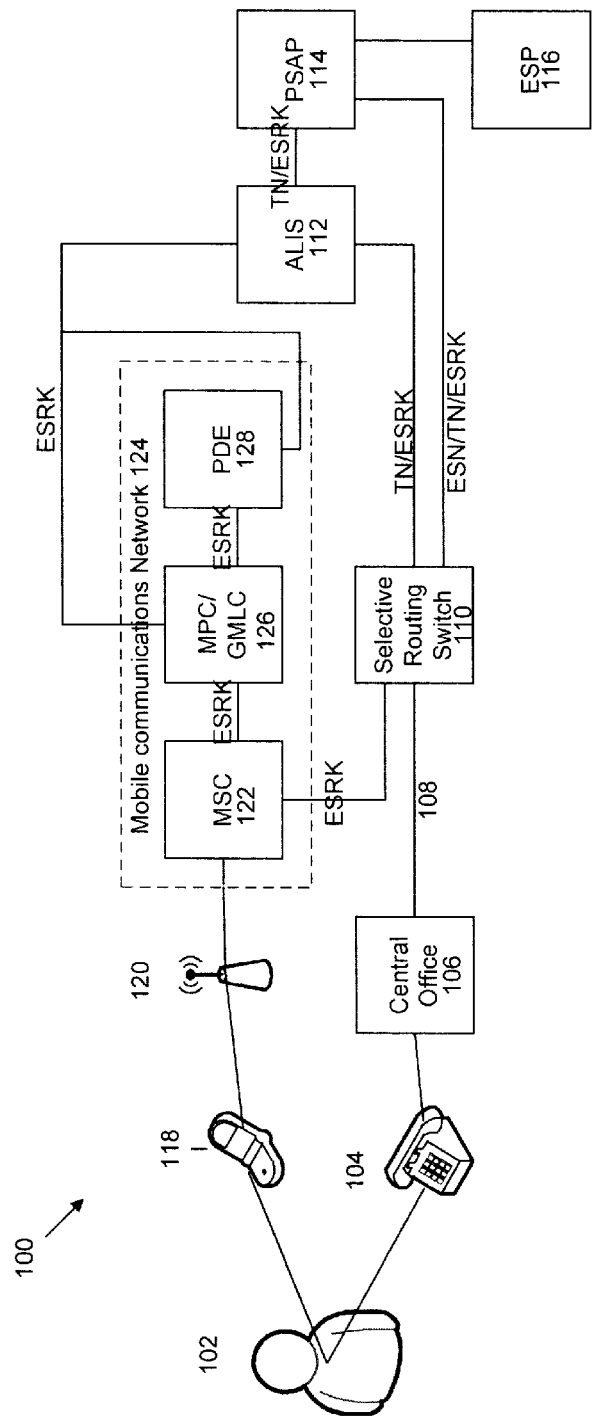
FIG. 1 depicts an exemplary emergency service communications network.

Referring now to FIG. 1, an exemplary emergency service communications network is depicted. In emergency service communications network 100, a caller 102 places an emergency call, for example, by dialing 9-1-1, using a wired telephone 104. Central office 106, which is connected to telephone 104, recognizes from the dialed number that this call requires emergency treatment. Central office 106 then seizes a trunk 108 to selective router 110 and transmits the telephone number (TN) of telephone 104 to selective router 110. Telephone number (TN) uniquely identifies telephone 104 in emergency service communications network 100 and may be used interchangeably with directory number (DN) as an automatic number identification when the directory number is sent from one network component to another.

Once selective router 110 receives the call with the telephone number (TN), it selects the appropriate PSAP 114, based upon the TN, and forwards the call to that Public Safety Answering Point (PSAP). When PSAP 114 receives the call from telephone 104, it queries the Automatic Location Identification 112 with the TN that it received from the selective router 110. The ALI 112 then performs a database lookup using the TN as a key and retrieves records associated with the TN. Examples of records retrieved include caller's location information, such as, a street address, geo-location coordinates, and the like. ALI 112 then forwards these records to PSAP 114 for its use in providing proper emergency response.

In addition to a wired telephone call, caller 102 may place an emergency call using a cellular phone 118. Cellular phone 118 transmits the call to a cellular tower 120, which forwards the call to a mobile switching center (MSC) 122 within a mobile communications network 124. In some embodiments, subscribers may place voice calls, transmit/receive data, and/or send short messages from their respective cellular phones. In addition to cellular phone 118, caller 102 may place emergency call or other calls via other devices, such as Voice over Internet Protocol (IP) devise or other devices that do not have a traditional telephone number. An example is an international caller who is calling from a 13-digit phone number.

The mobile switching center (MSC) 122 receives the call and contacts a mobile positioning center (MPC) or Gateway Mobile Location Center (GMLC) 126 to obtain routing instruction on how to route the call. The MPC may query the Position Determining Entity (PDE) or Serving Mobile Location Center (SMLC) 128 in order to establish a geographical area for routing the call to an appropriate PSAP.

Once the location is determined, MPC/GMLC 126 returns an emergency service routing key (ESRK) to the MSC 122. This ESRK will ultimately be used by the PSAP 114 to identify the emergency call. This ERSK will also be used by the MSC 122 to route the call to the appropriate selective router 110 and for the selective router 110 to route the call to the appropriate PSAP 114. MSC 122 then sends the call identified by the ESRK to selective router 110. Selective router 110 determines the appropriate PSAP to route the call based upon the ESRK that it received. The selective router 110 routes the call to the appropriate PSAP and passes along the ESRK with the call.

Similar to the wired call, PSAP 114 uses the ESRK of cellular phone 118 as a key to query ALI 112 for records associated with cellular phone 118. ALI 112 forwards the ESRK to MPC/GMLC 126, which returns the cached caller information which typically includes information such as the caller's carrier, their PSTN phone number and their location. This information is returned to the PSAP 114 for its use in providing proper emergency response.

Cellular phone 118, however, may have restrictions placed in it, which prevents calls and text messages to and from phone numbers that are not designated as "allowed numbers". In that case, PSAP 114 may not be able to initiate a callback to cellular phone 118, which significantly impacts the efficiency of emergency services provided by PSAP 114. Aspect of the present disclosure provides a system for providing temporary callback numbers to PSAPs, such that callbacks may be initiated without being blocked.

Figure 2:
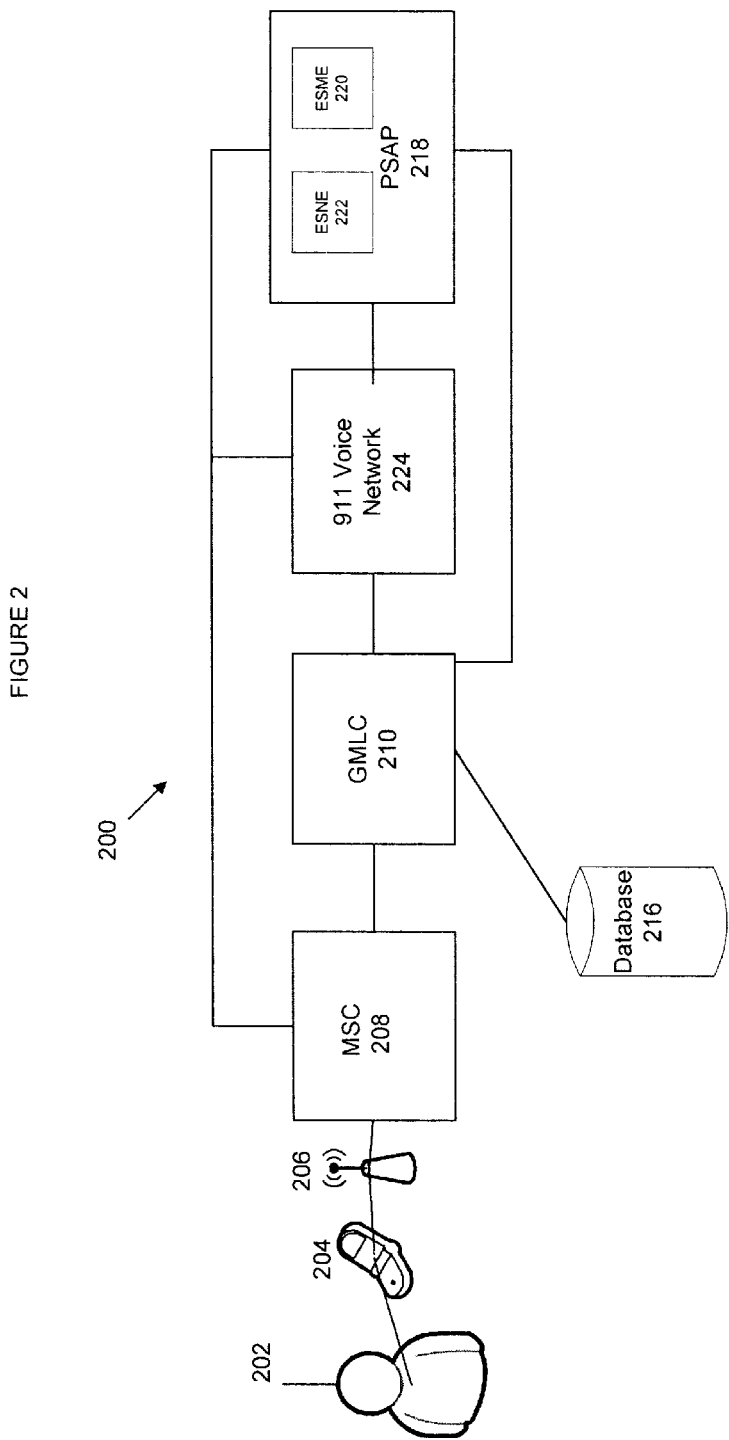
FIG. 2 depicts a system for providing temporary callback numbers for emergency calls to emergency service providers in accordance with one embodiment of the present disclosure.

FIG. 2 provides a system for providing temporary callback numbers for emergency calls to emergency service providers. Similar to system 100, caller 202 may place a 9-1-1 emergency call using a cellular phone 204. Cellular phone 204 transmits the call to a cellular tower 206, which forwards the call to a mobile switching center (MSC) 208. The MSC 208 queries the MPC/GMLC 210 for routing instructions. The MPC/GMLC 210 queries a database 216 to help determine if the subscriber needs to have a temporary callback number assigned. Database 116 may be a database of a mobile service provider comprising of all users, groups of users, classes of users or users that may have some form of a restriction. If the MPC/GMLC 210 determines that a temporary callback number needs to be assigned, because the current callback number can not be use to callback the caller, the MPC/GMLC 210 will assign a temporary callback number for this call and will store that number for later use.

The MPC/GMLC 210 will then return the routing information to the MSC 208 so that it can route the call to the Emergency Services Voice network 224. The Emergency Services Voice network 224 will route the call to the appropriate PSAP. The emergency services voice network 224 may be implemented as a Selective router 110 or similar device. Upon receiving the call, the PSAP 218 sends a query to MPC/GMLC 210, through the Emergency Services Data network 234 for the callback number and location information of cellular phone 204. In this example, the callback number has been replaced with the temporary callback number by the MPC/GMLC 210.

Upon receiving the temporary callback number and location information, the PSAP 218 stores the information for later use. After some time has passed, PSAP 218 initiates a call back to the cellular phone 204 over the telephone network 254 using the temporary callback number as the destination number. The telephone network 254 routes the call to the Temporary Callback Number Gateway 244. The temporary callback number gateway 244 then sends a query to MPC/GMLC 210 for the actual callback number of cellular phone 204. When GMLC 210 returns the actual callback number, the Temporary Callback Number Gateway 244 acts as an intermediary and routes the callback to MSC 208 over the PSTN or a dedicated network. The Temporary Callback Number Gateway 244 replaced the Calling Party Number of the incoming call from the PSAP 218 with a predetermined value known by the MSC that will allow the call to be delivered to the cellular phone 204. Upon receiving the call, MSC 208 allows the call back to reach cellular phone 204 without being blocked.

Figure 3:
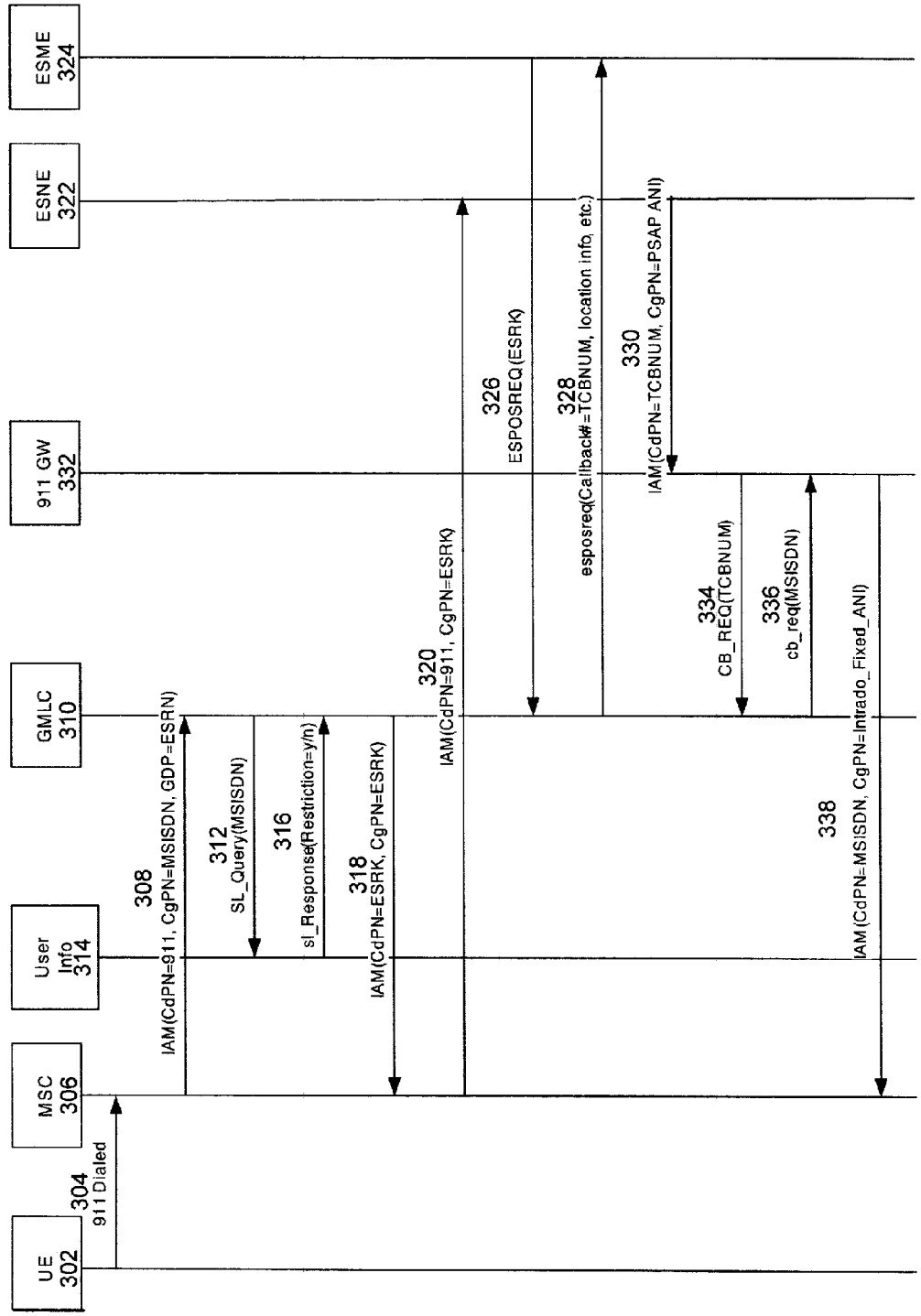
FIG. 3 depicts a diagram illustrating call flows for providing temporary callback numbers for emergency calls in accordance with one embodiment of the present disclosure.

Referring to FIG. 3, a diagram illustrating call flows for providing temporary callback numbers for emergency calls is depicted in accordance with an embodiment of the present disclosure. All or some of the steps in FIG. 3 may be implemented as computer instructions executing within one or more of the depicted modules. User equipment 302 dials an emergency 9-1-1 call 304. MSC 306 detects the 9-1-1 emergency call 304 and launches an initial address message (IAM) 308 to GMLC 310. In one exemplary implementation, IAM message 308 comprises multiple fields but only three relevant fields are shown: CdPN, CgPN, and GDP. CdPN may comprise a mobile station integrated service digital network (MSISDN) of user equipment 302. MSISDN is a unique public telephone network identifier assigned to cellular phone 204 or equipment entity 302. CdPN may comprise "911" or similar identifier indicating an emergency call. GPD may comprise an emergency service routing number (ESRN), which is a 10-digit number identifying the cell site the 9-1-1 call was initiated on.

Upon receiving the IAM message 308, GMLC 310 determines if restrictions are imposed on user equipment 302 which will block or redirect callbacks from the PSAP by initiating a query 312 to the User Info database 314. The user info database 314 may be a local database, carrier database, Home Location Register or other similar database containing user information and call restrictions. The query 312 may contain the users MSISDN, IMSI or other unique identifying value that identifies user equipment 302. The user info database 314 returns back any restrictions 316 that may be imposed upon the user equipment 302 which may prevent the PSAP from calling back the user equipment 302.

If restrictions are imposed on user entity 302 for incoming calls or the GMLC 310 believes that for some other reason the may not be able to call back the user equipment 302 or have enough information to call back the user equipment 302, the GMLC 310 allocates a temporary callback number (TCBNUM) that will be used as a callback number to ultimately reach user equipment 302 for 9-1-1 emergency call 304. The duration of TCBNUM may be predefined and last for a period of time, for example, several minutes, hours or days. Once the TCBNUM is allocated, GMLC 310 returns an IAM message 318 to MSC 306 to complete the loop around call. In one exemplary implementation, IAM message 318 comprises at least two fields: CdPN and CgPN, both of which comprise the emergency service routing key (ESRK).

Based on the routing information provided by GMLC 310, the MSC 306 routes the 9-1-1 emergency call to emergency services voice network 322 and eventually to the interconnected PSAP. In this example, the call may be routed by sending an IAM message 320 to the emergency services voice network 322. In other embodiments of the present disclosure, other methods to route the call may be used such as MultiFrequency signaling and Voice over Internet Protocol. IAM message 320 comprises at least a CdPN and CgPN. CdPN comprises a "911" or other identifier indicating an emergency call. CgPN may comprises an ESRK identifying the PSAP to which the emergency call is routed and an identifier of the caller. In other embodiments of this invention, other identifiers of an emergency call may be used including but not limited to ESRD and MSISDN. Upon receiving the IAM message, emergency services data network 324 of PSAP sends a query to GMLC 310 for location and callback information of user equipment 302. The query may be sent via an ESPOSREQ message 326 that contains at least the ESRK.

Upon receiving the query, GMLC 310 returns the location and callback information of user equipment 302. In this example, the temporary callback number will be returned in place of the actual callback number. The information may be enclosed in an esposreq message 328. In this way, the PSAP will use the temporary callback number to initiate the callback instead of the actual callback number. In addition, the esposreq message 328 comprises location information of user equipment 302.

After the emergency call, the PSAP initiates a callback to user equipment 302. The PSAP places a call to the temporary callback number through the PSTN or other dedicated network. The temporary callback number (TCBNUM) is one of the numbers in a pool of numbers hosted by the temporary callback number gateway 332. The call is routed to temporary callback number gateway 332 over the PSTN or other dedicated network.

After receiving the call 330, temporary callback number gateway 332 sends a query 334 to GMLC 310 for the actual callback number of user equipment 302. The query 334 comprises the temporary callback number assigned by GMLC 310. GMLC 310 then identifies the corresponding actual callback number and returns the actual callback number to the temporary callback number gateway 332 in a cb_req message 336. The actual callback number is the MSISDN or some other routable identifier that can be used to route to the user equipment 302. In turn, temporary callback number gateway 332 tandems the call back to the user equipment 302 based upon the MSISDN or other routable identifier. The temporary callback number gateway 332 will replace the received Calling Party number information or similar information with some predetermined value that will inform the MSC to allow the call to be connected to the user equipment 302. The callback 338 is routed to the MSC 306 over PSTN or other dedicated network. When MSC 306 receives the IAM message 338, it allows the callback to reach user equipment 302 based on the unique pre-determined ANI enclosed in the calling party number. In this way, callbacks initiated from PSAP may reach the user equipment 302 without being blocked or redirected.

Figure 4:
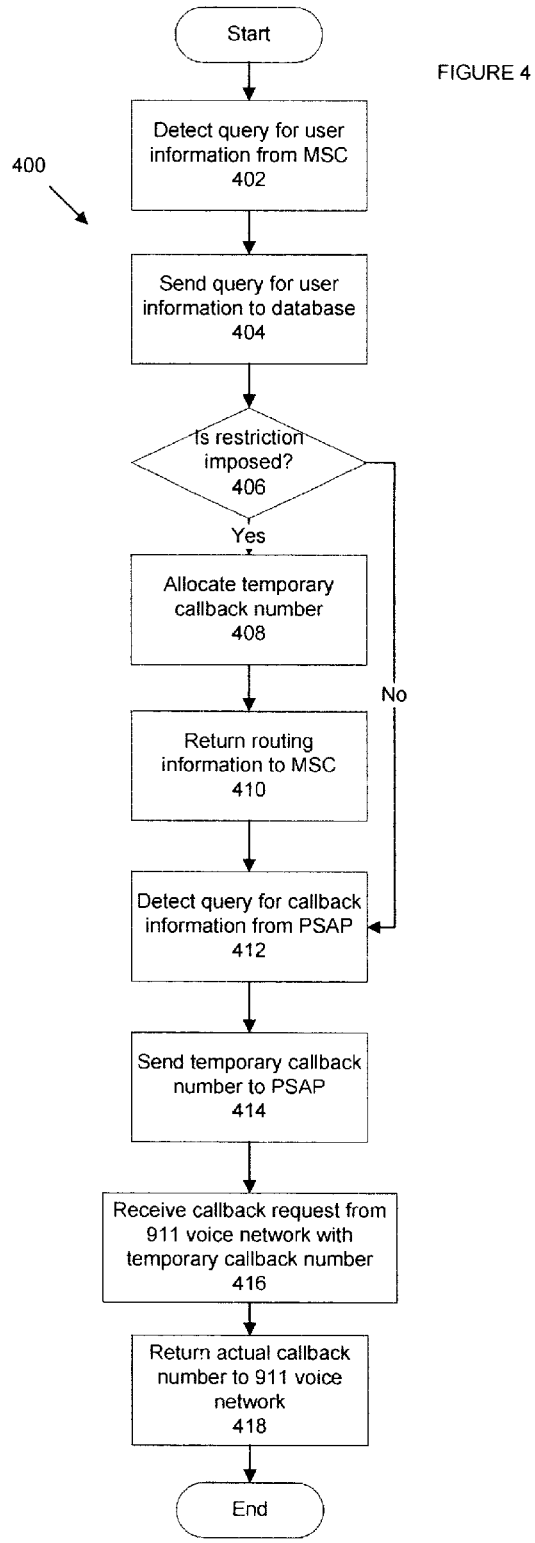
FIG. 4 depicts a flowchart of a process for providing a temporary callback number for emergency calls in accordance with one embodiment of the present disclosure.

Referring to FIG. 4, a flowchart of a process for providing a temporary callback number for emergency calls is depicted in accordance with an embodiment of the present disclosure. Process 400 may be but is not limited to be implemented as computer instructions executing within the gateway mobile location center (GMLC) 310. In this example, process 400 begins at step 402 when the GMLC detects the initiation of a 9-1-1 from the MSC. Next, process 400 continues to step 404 to send a query for user information to the user information database.

Process 400 then continues to step 406 to determine if a restriction is imposed on the user based on the user information. If a restriction is imposed, process 400 continues to step 408 to allocate a temporary callback number for the user which will replace the normal callback number in step 414. Process 400 then continues to step 410 to return routing information to the MSC. If no restriction is imposed, process 400 continues to step 410.

Process 400 then continues to 412 where GMLC detects a query for callback and location information from the PSAP. This query is initiated as a result of a callback request from the PSAP. Process 400 then completes at step 414 to send the temporary callback number allocated for the user to the PSAP.

Figure 5:
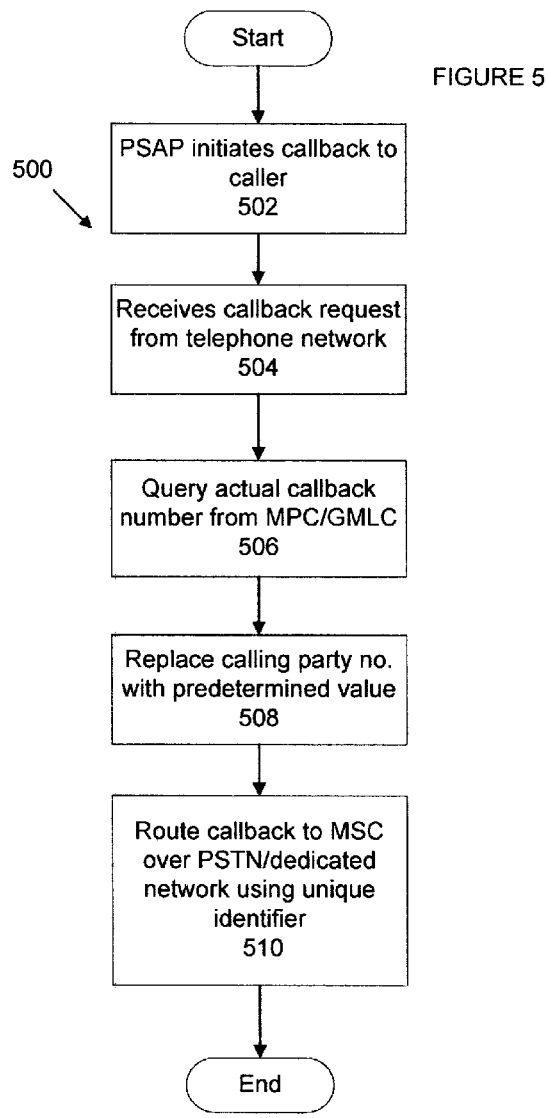
FIG. 5 depicts a flowchart of a process for routing a callback from the PSAP to a caller.

Referring to FIG. 5, a flowchart of a process for routing a callback from the PSAP to a caller is depicted in accordance with an embodiment of the present disclosure. Process 500 may be but is not limited to be implemented as computer instructions executing within the temporary callback number gateway 244. In this example, process 500 begins at step 502 where after some time the PSAP decides to initiate a callback to the caller. Once the callback call is initiated, process 500 then continues to step 504 to receive a callback request from 911 telephone network 254. The callback request includes the temporary callback number allocated by GMLC. Process 500 then continues to step 506 to query the actual callback number from MPC/GMLC 210. Once the actual callback number is obtained, process 500 continues to step 508 to replace the calling party number with a predetermined value that will inform the MSC to allow the call to be connected to the caller.

Process 500 then completes at step 510 to route the callback to the MSC 306 over PSTN or other dedicated network, which then tandems the call to the MSC by using a unique identifier so that the MSC will allow the call through. Using the temporary callback number, the PSAP may reach the user without being blocked or redirected by the restriction imposed on the user.

In summary, aspects of the present disclosure provide a method, system, and computer readable media comprising instructions for providing a temporary callback number for emergency calls. By allocating a temporary callback number in place of the actual callback number, emergency callbacks may be initiated by PSAP to user with call restrictions without being blocked or redirected.

It is noted that the present disclosure is not limited to the application of wired or wireless calls or to emergency service use. For example, the caller may be using a Voice over IP device that does not have a phone number but a Session Initiation Protocol address such as john@smith.us. Instead of the SIP address, a temporary callback number may be assigned to the Voice over IP device for a later callback from the PSTN.

The present disclosure may also be used by an international caller with a 13-digit phone number. Because the PSAP can only display ten digits, a temporary callback number may be assigned to this 13-digit number for the PSTN to initiate a later callback.

In addition to the above discussion in the context of a GSM network, aspects of the present disclosure may be implemented in other types of telecommunications network, such as a code division multiple access network.

Systems, methods, and computer readable media comprising instructions have been shown and/or described in the above embodiments for providing temporary callback numbers for emergency calls. Although the above descriptions set forth preferred embodiments, it will be understood that there is no intent to limit the invention by such disclosure, but rather, it is intended to cover all modifications, substitutions, and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

What is claimed is:

1. A method, comprising:
    determining if a restriction is imposed on a mobile user for incoming calls, wherein the determining if the restriction is imposed comprises querying a user information database, the query comprises an identifier identifying a mobile device of the mobile user;
    allocating a temporary callback number to the public safety answer point to prevent the mobile device from blocking or restricting an incoming call from the public safety answering point;
    sending a query for callback and location information of the mobile user from the public safety answering point to a mobile positioning center or a global mobile location center via an emergency services data network;
    and
    sending the temporary callback number and location information of the mobile user to the public safety answer point for use of the temporary callback number to call the mobile device.

2. The method of claim 1, wherein the callback comprises a unique predetermined automatic name identification (ANI) indicating an emergency callback.

3. The method of claim 2, further comprising:
    responsive to receiving the unique predetermined automatic name identification, allowing the callback to reach the mobile user.

4. The method of claim 1, further comprising:
    detecting a request for information of the mobile user;
    sending a query for the information of the mobile user to a database; and
    receiving the information from the database, the information comprising whether a restriction is imposed on the mobile user.

5. The method of claim 4, further comprising:
    assigning the temporary callback number for the mobile user if a restriction is imposed on the mobile user.

6. The method of claim 5, further comprising:
    storing the temporary callback number at a mobile positioning center or global mobile location center for later use.

7. The method of claim 6, further comprising:
    returning routing information to a mobile switching center for routing future calls from the mobile user via an emergency services voice network.

8. The method of claim 1, further comprising:
    receiving the request for a callback from a telephone network, the request comprising the temporary callback number;
    routing the request to a temporary callback number gateway; and
    sending the temporary callback number to a mobile positioning center or global mobile location center for an actual callback number.

9. The method of claim 8, wherein the a mobile positioning center or global mobile location center is a selective router.

10. The method of claim 8, further comprising:
    identifying the actual callback number corresponding to the temporary callback number;
    replacing the actual callback number with a predetermined value known by a mobile switching center of the mobile user; and
    routing the callback to the mobile unit via the mobile switching center using the predetermined value.

11. The method of claim 10, wherein the predetermined value comprises an automatic name identification enclosed in a calling party number.

12. The method of claim 8, wherein routing the callback to the mobile unit comprises:
    routing the callback to the mobile switching center over a public switch telephone network (PSTN) or a dedicated network.

13. The method of claim 10, wherein the predetermined value informs the mobile switching center to allow the callback to be connected to a mobile unit used by the mobile user.

14. A method, comprising:
    receiving a call initiated from a caller using a voice over Internet Protocol device;
    determining if a restriction is imposed on the caller for incoming calls, wherein the determining if the restriction is imposed comprises querying a user information database, the query comprises an identifier identifying a mobile device of the caller;
    assigning a temporary callback number to the public safety answer point to prevent the mobile device from blocking or restricting an incoming call from the public safety answering point;
    sending a query for callback and location information of the mobile user from the public safety answering point to a mobile positioning center or a global mobile location center via an emergency services data network;
    and
    responsive to receiving a call from the caller, sending the temporary callback number and location information of the mobile user to the public safety answer point to use the temporary callback number to call the caller.

15. A non-transitory computer readable medium comprising instructions that, when read by a processor, perform:
    receiving a call initiated from a caller having an international phone number;

determining if a restriction is imposed on the caller for incoming calls, wherein the determining if the restriction is imposed comprises querying a user information database, the query comprises an identifier identifying a mobile device of the caller;

assigning a temporary callback number to the public safety answer point to prevent the mobile device from blocking or restricting an incoming call from the public safety answering point;

sending a query for callback and location information of the mobile user from the public safety answering point to a mobile positioning center or a global mobile location center via an emergency services data network; and responsive to receiving a call from the caller, sending the temporary callback number and location information of the mobile user to the public safety answer point for use of the temporary callback number to call the caller having the international phone number.

16. A system, comprising:

a mobile unit;

a mobile switching center (MSC) communicably coupled to the mobile unit;

a gateway mobile location center (GMLC) or Mobile Positioning Center (MPC) that determines if a restriction is imposed on a mobile user for incoming calls, wherein the determination comprises a query of a user information database, the query comprises an identifier that identifies the mobile unit of the mobile user, and determines routing of an emergency call initiated from the mobile unit, the GMLC or MPC is communicably coupled to the MSC and an emergency service data network;

a temporary callback number gateway communicably coupled to the GMLC or MPC and a telephone network; and a public safety answering point that initiates a callback to the mobile unit through the telephone network and sends a query for callback and location information of the mobile user to the GMLC or the MPC via the emergency service data network, the public safety answering point is communicably coupled to the emergency service data network;

wherein the GMLC or MPC is configured to assign and send a temporary callback number and location information of the mobile user to the public safety answer point when a restriction is imposed on the mobile unit;

wherein the mobile unit is configured to receive an incoming call from the public safety answer point using the temporary callback number.

17. The system of claim 16, wherein the callback comprises a unique predetermined automatic name identification indicating an emergency call.

18. The system of claim 16, further comprising:

a database for storing user information of the mobile unit, the database is communicably coupled to the gateway mobile location center or mobile positioning center.

19. The system of claim 16, further comprising:

an emergency call voice network communicably coupled to the MSC and to the public safety answering point;

wherein the emergency call voice network is operable to selectively route the emergency call for the public safety answering point, and the emergency service data network is operable to identify a temporary callback number of the mobile unit from the GMLC or MPC.

20. The system of claim 16, wherein the GMLC or MPC is further configured to generate the temporary callback number for the mobile unit and store the temporary callback number for later use.

21. The system of claim 20, wherein the telephone network is operable to receive a request for a callback from the public safety answering point, the request comprising the temporary callback number and location information of the mobile unit.

22. The system of claim 20, wherein the temporary callback number gateway is operable to receive the temporary callback number from the telephone network and identify an actual callback number based on the temporary callback number.

23. The system of claim 22, wherein the temporary callback number gateway is further operable to replace the actual callback number with a predetermined value and route the callback to the mobile unit using the predetermined value.

24. The system of claim 18, wherein the gateway mobile location center is operable to send a query to the database and determine if a restriction is imposed on the mobile unit based on information received from the database.

* * * * *

UNITED STATES PATENT AND TRADEMARK OFFICE
CERTIFICATE OF CORRECTION

PATENT NO. : 9,848,310 B1  
APPLICATION NO. : 14/266271  
DATED : December 19, 2017  
INVENTOR(S) : Snapp Page 1 of 1

It is certified that error appears in the above-identified patent and that said Letters Patent is hereby corrected as shown below:

In the Claims

In Column 8, Claim 9, Line 19, delete "the a" and insert -- the --, therefor.

Signed and Sealed this  
First Day of July, 2025

Coke Morgan Stewart  
*Acting Director of the United States Patent and Trademark Office*